United States Patent [19]

Hoffmann

[11] Patent Number: 5,502,943

[45] Date of Patent: Apr. 2, 1996

[54] DISPLAY FRAME

[75] Inventor: Paul D. Hoffmann, Kirkwood, Mo.

[73] Assignee: Optima Graphics, Fenton, Mo.

[21] Appl. No.: 352,360

[22] Filed: Dec. 9, 1994

[51] Int. Cl.⁶ .................................................. F16C 11/00
[52] U.S. Cl. .......................... 52/645; 52/656.1; 52/656.9; 403/61
[58] Field of Search ..................... 52/645, 656.1, 52/656.9; 403/59, 61, 79, 157

[56] References Cited

U.S. PATENT DOCUMENTS

| | | | |
|---|---|---|---|
| 555,201 | 2/1896 | Ascheck | 403/61 |
| 749,112 | 1/1904 | Steer | 403/61 |
| 769,325 | 9/1904 | Schade | 403/61 |
| 1,039,986 | 10/1912 | Merritt | 403/61 |
| 2,282,393 | 5/1942 | Block | 403/61 |
| 2,790,259 | 8/1954 | Havens | 40/155 |
| 2,897,013 | 7/1959 | Delp | 52/645 |
| 3,235,038 | 2/1966 | Nesslinger | 52/645 X |
| 4,611,945 | 9/1986 | Diego | 403/61 |
| 4,799,610 | 1/1989 | Hsieh | 403/61 X |
| 4,824,278 | 4/1989 | Chang | 403/61 X |

*Primary Examiner*—Wynn E. Wood
*Attorney, Agent, or Firm*—Polster, Lieder, Woodruff & Lucchesi

[57] ABSTRACT

A display frame work is described in terms of a display header, with upper and lower horizontal tubes and vertical end tubes to define a rectangular frame to which a flexible cloth, paper or plastic header panel is attached. Each of the horizontal members has a central hinge with a horizontal pintle from which leaves extend in opposite directions when the device is assembled. One of the leaves is fixed in a central tube; the other is constructed to permit the tube to which it is mounted to slide toward and away from the pintle. The fixed leaf has a locking tab projecting beyond the pintle, and the sliding travel of the tube that is slidably mounted is from a position clear of the locking tab to one embracing the locking tab. Outboard end sections of the horizontal members are hinged to the central tube members in a way similar to that of the two central tubes, but on hinges pintles of which are oriented perpendicularly to the central member hinge pintle. The tubes are hollow and open ended. The vertical end members have, projecting at right angles from the vertical end members, fingers that extend into the open ends of the outboard sections of the horizontal members. The vertical end pieces have, at one end, a hook, pivotally mounted on a knuckle carried by a leaf mounted on one side surface of the vertical end member.

12 Claims, 4 Drawing Sheets

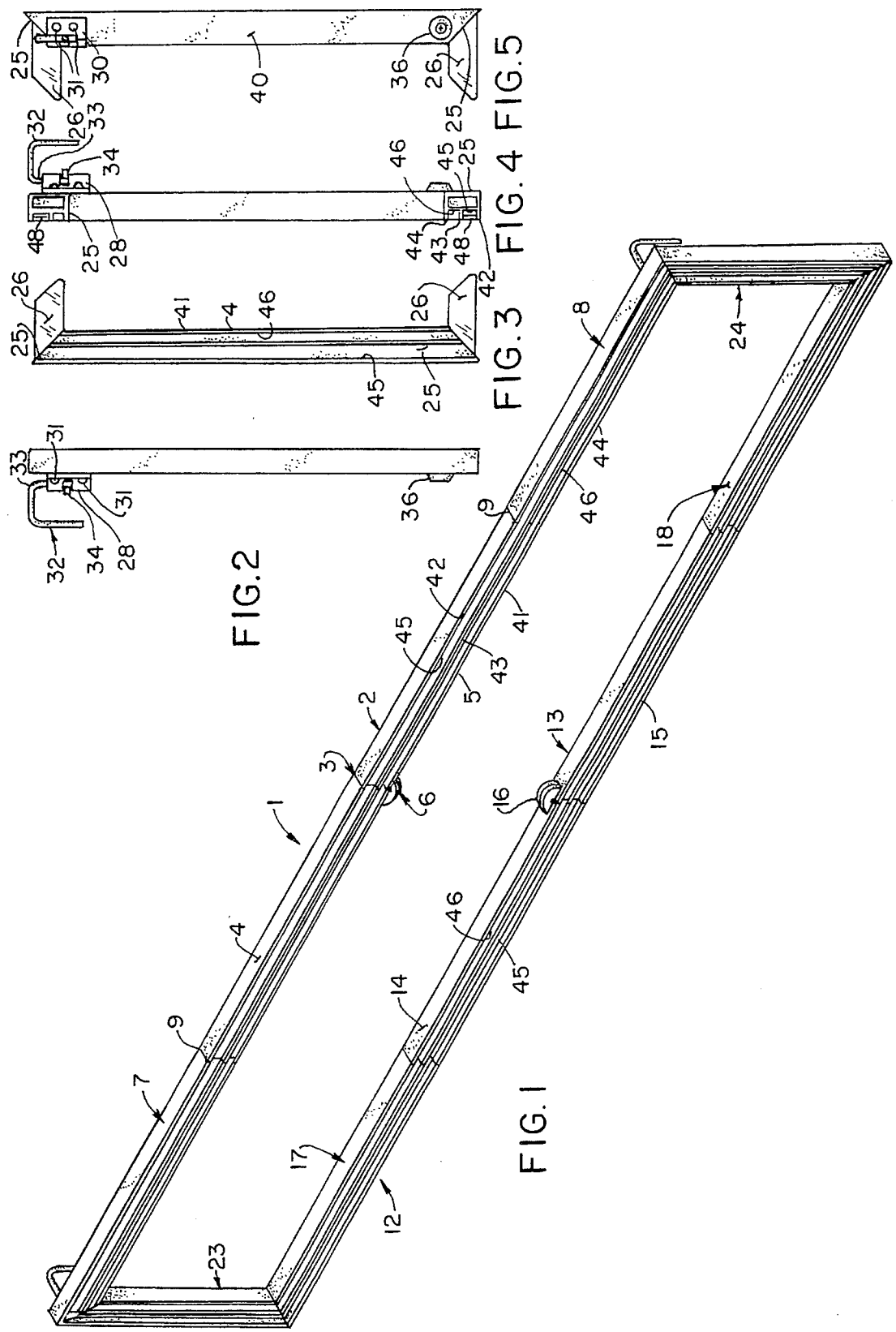

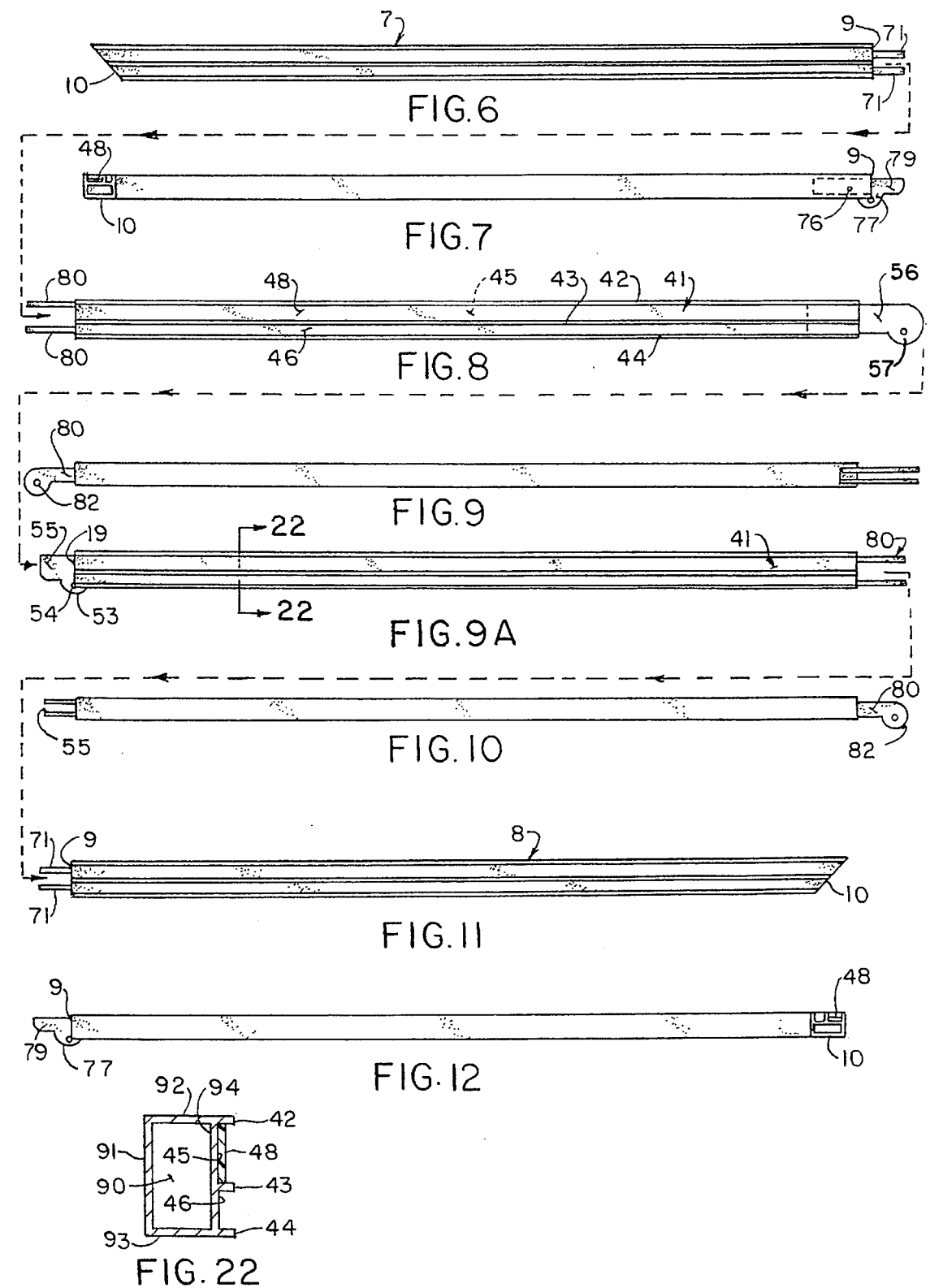

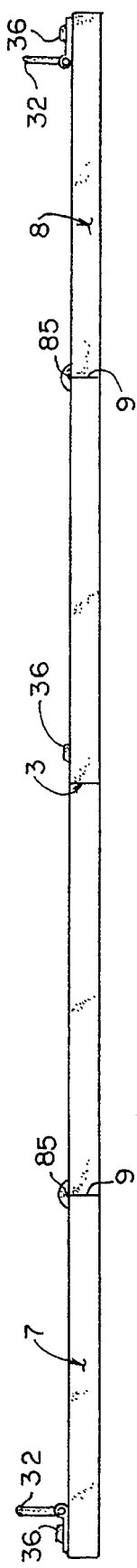
FIG.19
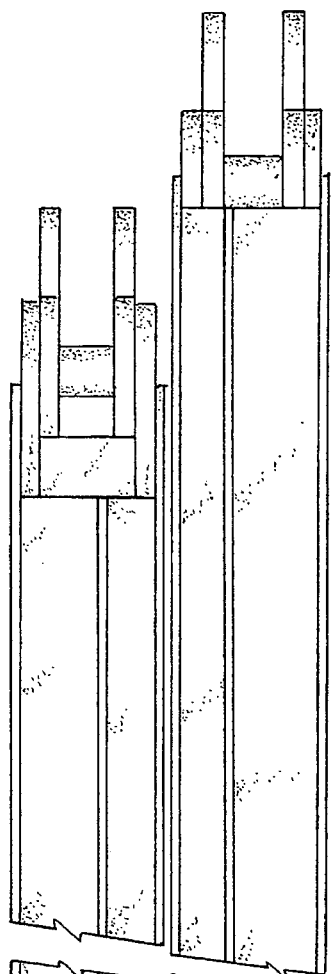
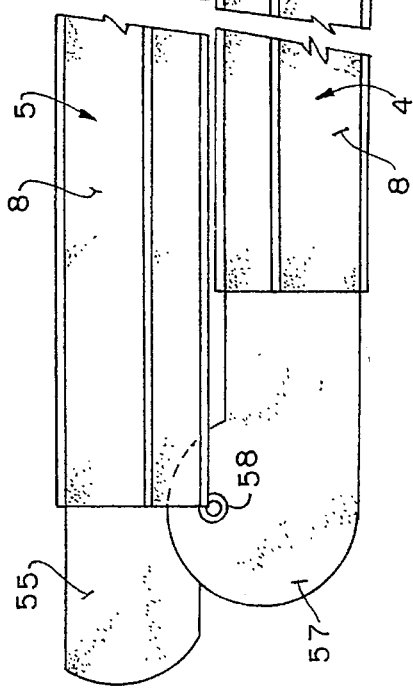
FIG.20
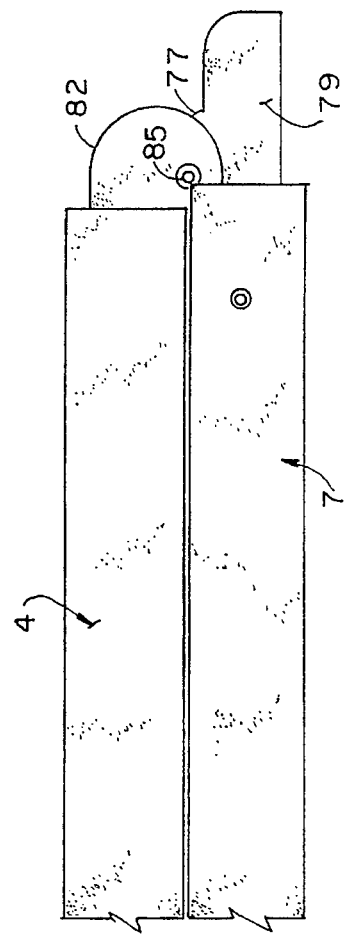
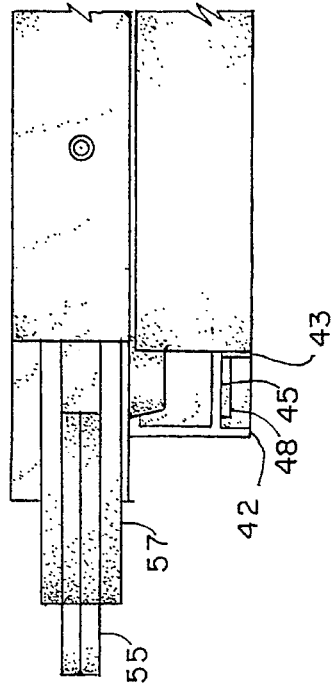
FIG.21

5,502,943

DISPLAY FRAME

BACKGROUND OF THE INVENTION

Products, services, and companies offering them in display booths at trade shows and the like are commonly identified by headers, strips of paper, cloth or plastic mounted on a frame, often by means of magnetic strips or strips of Velcro (hook and loop fasteners) secured to and around one side of the header adjacent margins of the header and held by a complementarily configured fastener strip secured to the frame. Such a display is illustrated in FIG. 1 of U.S. Pat. No. 5,058,359. The frames themselves are often 6 to 10 feet long and 12 to 18 inches high. If each of the horizontal frame member is made as one continuous piece, the members are, for practical purposes, unportable. If they are made in separate pieces, they are liable to get lost or damaged, and fasteners or fittings used to assemble them are also inconvenient and liable to be lost.

The frame of this invention is described as a header frame, with long horizontal members and relatively short vertical members. However, the frame is really a versatile graphics carrier or showpiece. It may be used, for example, in a free-standing panel with relatively long vertical members and horizontal members that can be somewhat longer proportionally than the vertical members of the illustrative embodiment, which panel can be used by itself or in combination with other such panels to form a wall display. A frame of this invention can also be used in a bridge panel. Thus, although the long members are called horizontal members and the shorter members vertical members for convenience in describing the frame as a header frame in the description and claims, the terms "horizontal" and "vertical" are to be considered the equivalent of "longer" and "shorter".

One of the objects of this invention is to provide a graphic carrier frame or the like that is strong, attractive, and foldable, and that requires no fasteners, fittings, or other extraneous parts.

Other objects will become apparent to those skilled in the art in the light of the following description and accompanying drawing.

DRAWING

In the drawing, FIG. 1 is a view in perspective of a header frame made in accordance with one illustrative embodiment of this invention, fully assembled;

FIG. 2 is a view in side elevation of an outboard side of a vertical end member of the frame shown in FIG. 1;

FIG. 3 is a view in front elevation of the end member shown in FIG. 2;

FIG. 4 is a view in side elevation of an inboard side of the end member of FIGS. 2 and 3;

FIG. 5 is a view in rear elevation of the end member shown in FIGS. 2 through 4;

Figure 13:
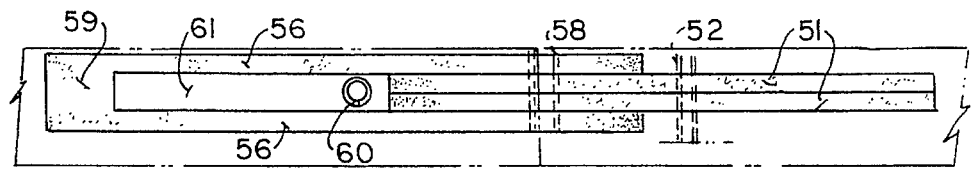
Figure 14:
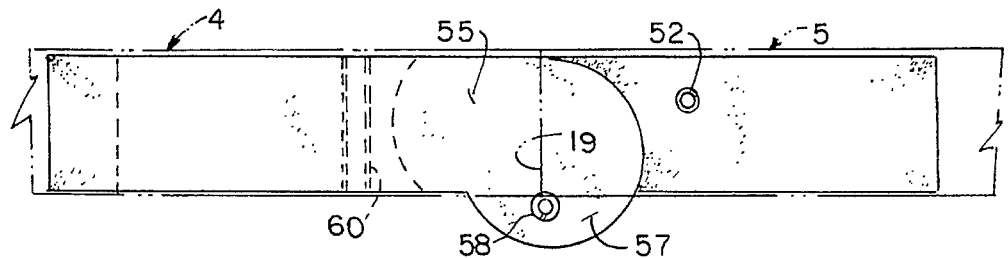
Figure 15:
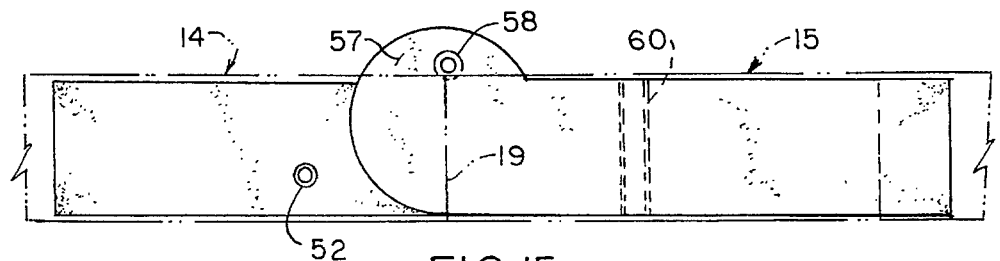
Figure 16:
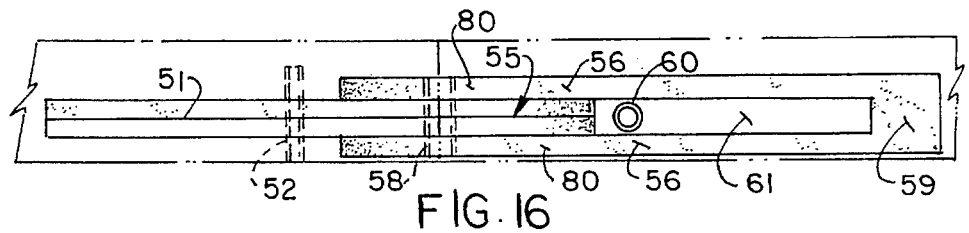
Figure 17:
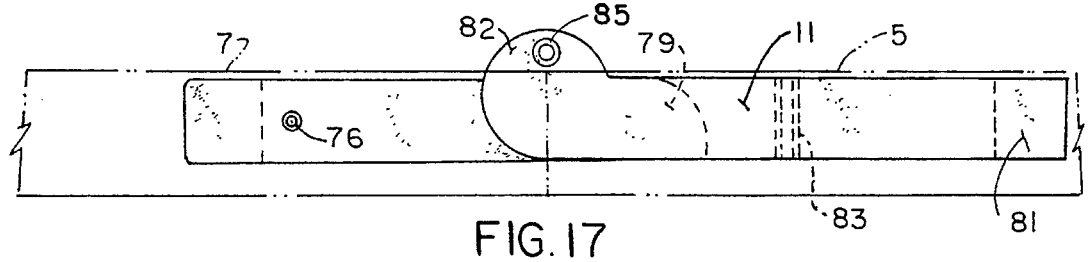
Figure 18:
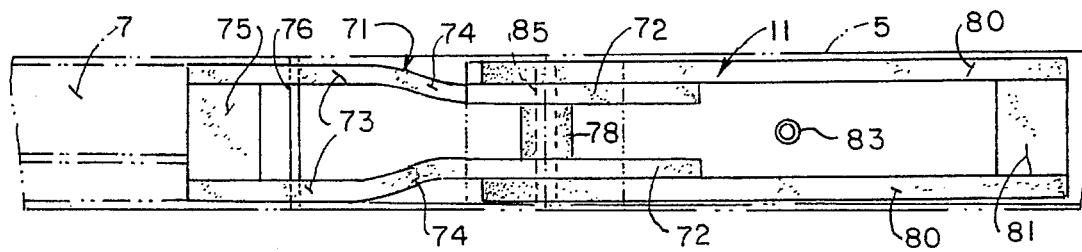

FIG. 6 a view in front elevation of an outboard tube constituting a part of a horizontal member of the frame;

FIG. 7 is a top plan view of the tube of FIG. 6;

FIG. 8 is a view in front elevation of one of two central tubes making up the horizontal member;

FIG. 9 is a top plan view of the central tube shown in FIG. 8;

FIG. 9A is a view in front elevation of the other of the two central tubes;

FIG. 10 is a top plan view of the central tube of FIG. 9A;

FIG. 11 is a view in front elevation of an outboard tube at the opposite end of the horizontal member from the outboard tube of FIG. 6;

FIG. 12 is a top plan view of the outboard tube of FIG. 11;

FIG. 13 is a plan view of a central hinge member, with central tubes shown in phantom lines;

FIG. 14 is a view in side elevation of the hinge shown in FIG. 13, the hinge shown in FIGS. 13 and 14 being shown as installed in an upper horizontal frame rail;

FIG. 15 is a view in side elevation of a central hinge in a bottom rail;

FIG. 16 is a top plan view of the hinge shown in FIG. 15;

FIG. 17 is a view in side elevation of a hinge between the central reach of the rail and an outboard tube;

FIG. 18 is a top plan view of the hinge shown in FIG. 17;

FIG. 19 is a top plan view of the frame shown in FIG. 1;

FIG. 20 is a view in front elevation of a bottom rail in folded condition;

FIG. 21 is a top plan view of the horizontal frame rail of FIG. 20; and

FIG. 22 is a sectional view taken along the line 22—22 of FIG. 9A.

DESCRIPTION OF THE PREFERRED EMBODIMENT

Referring now to the drawing, and particularly to FIG. 1, reference numeral 1 indicates a complete, fully erected header frame. The frame 1 is made up of a top horizontal member 2, a bottom horizontal member 12, and vertical end tubes 23 and 24.

A central tube section has a central hinge assembly 6 with a horizontal axis. A left outboard tube section 7 is hingedly mounted to the left central tube section 4. A right outboard tube section 8 is hingedly mounted to the right central tube section 5. The hinge axes of the outboard tube sections are vertical.

The left and right outboard sections 7 and 8 are mirror images of one another. Each has a square end 9 which butts a square end of the contiguous section of the central tube, and a mitered end 10, as is shown particularly in FIGS. 6 and 11. Also, as shown particularly in FIGS. 6 through 12, 17 and 18, the outboard tube sections 7 and 8 are hinged to contiguous ends of the left and right tube sections 4 and 5 of the central span, by means of a hinge assembly 11.

The bottom horizontal member is identical to the top horizontal member, except that it is inverted and turned end for end. The bottom horizontal member 12 has a central tube section 13 made up of a left tube section 14 and a right tube section 15 joined by a hinge assembly 16. The bottom horizontal member has a left outboard section 17, and a right outboard section 18, each with a square end 19 and mitered end 20, being mirror images of the left and right outboard sections 7 and 8, as shown in FIG. 1.

The vertical end tubes 23 and 24 are likewise mirror images of one another. Each has two mitered ends 25, in each of which a shank of a finger is secured and from which a finger 26 projects, offset a short distance from the outer edge of the mitered end 25, as shown particularly in FIGS. 3 and 5. The fingers can be made of metal or plastic, of a size to fit within the hollow tubes, as is explained hereinafter.

All of the tubes, those making up the top and bottom horizontal members and those making up the vertical end members, have the same cross sectional configuration. They are substantially rectangular, with one plane side 40, and one ribbed side 41. On the ribbed side 41, ribs 42, 43 and 44 extend lengthwise, defining between them channels 45 and 46. A strip of magnetic tape 48 is mounted in the channel 45.

Each of the vertical end tubes has near its upper end a hook assembly, made up of a hook 32 with a stem 33 journaled in a knuckle 28 carried by a leaf 30 which, in the embodiment shown, is mounted on the plane side 40 of the vertical members by screws 31. The knuckle 28 has a transverse slot 29 in it. The stem 33 carries a stop pin 34, which moves in the slot 29, and stops the rotation of the hook 32 past the position shown in FIGS. 2, 4 and 5, but permits the hook to be rotated in a direction toward the upper horizontal member, or, when the vertical end tubes are dismounted, as shown in FIGS. 2 through 5, to be rotated until they lie parallel to the fingers 26. A bumper-spacer 36 on the plane side 40 of the vertical members projects substantially as far as the knuckle 28, so as to keep the frame vertical if the frame is mounted on a planar wall.

Referring now to FIGS. 6 through 18, 20 and 21, the central hinges 6 and 16 are identical in construction, merely being turned through 180° from one another when the frame is assembled, as shown in FIGS. 13 through 16. Their elements, accordingly, will be identified by the same reference numerals. In each of the hinge assemblies, a pair of inner leaves 51 are fixed to and in one of the central tube sections; in the right tube 5 of the upper rail as shown in FIG. 1, and in the left tube 14 of the lower rail. These leaves will be referred to as fixed leaves 51, because they are fixed against axial movement with respect to the tube to which they are secured. In this illustrative embodiment, the fixed leaves 51 are shown as held in position by a securing pin 52, fixed in, and extending through and between side walls of the central tube sections 5 and 14. The fixed leaves 51 carry knuckles 53, best shown in FIG. 9A. The knuckles 53 have a passage 54 extending through them. A locking tab 55, an extension of the fixed leaves 51, projects from a squared end 19 of the tube in which the leaves 51 are secured, again, as particularly shown in FIGS. 9A and 20. The other of the central rails or tubes is mounted on leaves 56, in such a way as to be movable through a limited distance toward and away from the locking tab 55. These leaves 56 will be referred to for convenience as sliding leaves. The sliding leaves 56 are parallel to one another and to the fixed leaves 51, are joined at ends remote from the tab 55 by a bridging piece 59, embrace the tab 55 and the leaves 51, and are provided with a knuckle 57. The knuckle 57 has through it a passage, aligned with the passage 54 of the fixed leaves, and adapted to receive a pintle 58 which, in ordinary use of the frame, is oriented horizontally, as indicated in FIG. 1. In the embodiment shown, the leaves 56 are shown as being made of one piece with the bridging piece 59 between the two leaves. The leaf 56 can, however, be joined by any suitable bridging means. In any case, the leaves define between them a channel 61 through which a mounting pin 60 extends. The mounting pin 60 is held securely in walls defining upper and lower surfaces of the tubes. The central tube mounted on the sliding leaves 56 can slide between a position at which it is clear of the locking tab 55 and a position at which the locking tab 55 extends into the passage that runs through the tubes, until a square end of 20 of the sliding tube butts against the square end 19 of the other center tube.

When the sliding tube has been slid to a position at which it clears the locking tab 55, the tube can be folded around the pintle 58 to the condition shown in FIG. 20, and the sliding tube can be slid toward the pintle 58 to shorten the effective length of the tube with respect to the fixed tube.

In the embodiment shown, two outboard sections are hingedly mounted on the ends of the central tubes. In this illustrative embodiment, the hinge assemblies 11 by which the outboard tubes are connected to the central tubes are shown as being made somewhat differently from the hinge assembly 16, but their functions are the same. As best shown in FIGS. 6 through 12, and 17 and 18, fixed leaves 71 are fixedly mounted in an outboard tube. In this case, the fixed leaves have an outer section 73 and inner section 72 parallel to but inboard of the outer section 73, an intermediate section 74 between the sections 73 and 72, a spacer block 75 between the leaves, to preserve the spacing at the axially outer end of the leaves, a knuckle 77, shown particularly in FIGS. 7 and 12, with a spacer 78 between its leaves, and a locking tab 79, which, like the locking tab 55 of the central section, projects beyond the square end of the outboard section 7 or 8, as the case may be. The fixed leaves 71 are secured against movement with respect to the outboard tube in which it is mounted by a pin 76, extending through holes in the outer section 73 of the fixed leaves. The central tube adjacent each of the outer tubes is mounted for limited sliding motion on "sliding" leaves 80, parallel to and straddling the inner section 72 of the fixed leaves 71. The sliding leaves 80 have a knuckle 82 with a passage through it, aligned with a passage through the knuckle 77 to receive a pintle 85. At an end opposite the pintle 58, the sliding leaves 80 are joined by a spacer-stop 81, which, like the spacer-stop 59 can be integral with the leaves 80, or Otherwise secured between them. A stop pin 83, fixed in the top and bottom walls of the central tube section adjacent the outboard section, limits the distance that the tube can be retracted, to the place at which it clears the locking tab 79 sufficiently to permit the outboard section to be folded around the pintle 85 to the position shown in FIGS. 20 and 21.

In dismantling the frame shown in FIG. 1, it is only necessary to pull the vertical end tubes outboard of the top and bottom horizontal tubes, withdrawing the fingers 26 from the channels 90 defined by a back wall 91, a top wall 92, a bottom wall 93, and a front wall 94, all of which are common to all of the tubes, horizontal and vertical. The outboard sections 7 and 8 are then pulled until the central tubes contiguous the respective outboard tubes have cleared the respective locking tabs 79, when the outboard sections can be folded around their pintles to lie flat against the center surface of the back wall 91 of the central sections. The central tubes sections 4 and 5 can then be pulled apart until the sliding section of the central span clears the locking tab 55, when the two tube sections 4 and 5 can be folded about the hinge 6 or 16 as the case may be, at right angles to the outboard sections, until the assembly is in the condition shown in FIGS. 20 and 21. The fact that the pintles 85 of the outboard section hinges are oriented at right angles to the central section pintle 58 provides several .advantages. The horizontal member is more rigid when erected, and the folded bundle is more compact than if the pintles were parallel.

Merely by way of illustration, if the frame 1 is to be 9 feet long and 18 inches high, the four sections making up the horizontal members can each be 27 inches long, and the end tubes, 18 inches. If the tubes are all ¾ inch wide and 1 inch high, the channels 45 and 46, about ⅛ inch deep, and the channel 90, about ½" by ⅞", the fingers 26 can be about 3" long from back to tip, projecting from the inner side of the vertical section about 2", and being sized to fit closely but slidably in the channel 90.

When the horizontal member is folded, the resultant bundle of each horizontal member will be 1½ inches by 2 inches by 29 inches, the locking tabs projecting approximately an inch. The vertical end members are, by definition, 18 inches high in this example. The hooks 32 fold toward the fingers 26. Thus, if the folded horizontal sections are stacked, and the vertical members arranged on either side, a bundle 3 by 3½ by 29 inches at the maximum, will be provided, with the vertical members ranging along either side. If the vertical members are less than 15 inches long, they can be ranged along one side, and reduce the width of the package by ¾ inch. In any event, a simple, easily erected and disassembled frame is provided, with only four separate parts, and requiring no tools, fasteners or other fittings.

As has been indicated, usually a header of flexible material with a complementary border of Velcro or magnetic tape is attached to the frame before the frame is hung on the wall or other support. The header itself will keep all of the parts in place. If the magnetic strips of both the frame and header are on the order of ⅟₁₆" thick, by providing a channel in which the magnetic tape of the frame is recessed about ⅟₁₆" from the outer edge of the rib 42, the header is permitted to be flush at its edges with the outer edge of the outer rib 42, which provides a neat, finished appearance. If Velcro is used, the depth of the channel can be decreased, to accommodate the thinner fastening strip.

Numerous variations in the construction of the device of this invention will become apparent to those skilled in the art in the light of the foregoing disclosure. The particular shapes of the frame members, their size, and even their configuration can be varied. The length and shape of the locking tabs and the configurations of the knuckles can be varied. The construction that has been described is the preferred one, but the outboard tubes can be made the sliding tubes, and the central section tubes fixed to a hinge plate. The order in which the sections of the horizontal (long) members are folded can also be varied. These are merely illustrative.

I claim:

1. A display frame comprising central horizontal tubes and vertical tubes, rectangular in transverse cross section said central horizontal tubes comprising two tube sections, a sliding tube section and a fixed tube section, mounted on leaves of a hinge, said hinge leaves having a pintle-receiving knuckle on a long edge of each leaf, said knuckle extending outward from said tube and a pintle mounted in and connecting said knuckles, outboard of said tube, about which said leaves rotate; said sliding tube section being mounted for sliding movement along a part of a pair of parallel first leaves on which it is mounted and said fixed tube section being fixed with respect to a pair of parallel second leaves on which it is mounted, said second leaves having a locking tab, of a size to be received in a recess of said sliding tube section, projecting past said pintle with respect to the leaf on which it is mounted, parallel with said leaf, whereby, when said leaves are aligned and parallel, said sliding tube section can be slid toward said fixed tube section, over and around said locking tab, and when said sliding tube section is slid clear of said locking tab, the two central tube sections can be folded to lie substantially flat against flat side surfaces of one another.

2. The frame of claim 1 wherein said tube sections have square frame ends that abut when said sliding tube section is slid against said fixed tube section.

3. The frame of claim 1 including at least one horizontal outboard tube section, rectangular in transverse cross section, mounted on an outboard tube section hinge with a pintle oriented perpendicularly to the pintle of the central horizontal tube sections, said outboard tube section hinge having first leaf means having a part extending into an open end of said central tube section and said outboard section hinge having second leaf means extending into an open end of said outboard tube section, one of said outboard tube section and said central tube section being slidably mounted on one of said leaf means, and the other of said outboard tube section and said central tube section being fixed to the other of said leaf means, the leaf means to which the tube section is fixed having a locking tab projecting from it beyond an end of said other, fixed tube section and beyond said pintle, whereby said sliding tube section can be slid toward said fixed tube section over and around said locking tab, at which condition the outboard tube section and central tube section are aligned, and when the said sliding tube section is slid clear of said locking tab, the outboard tube section can be folded over its adjacent central tube section to cause a substantially flat outboard tube section surface to lie substantially flat against a substantially flat surface of said adjacent central tube section perpendicular to a surface against which said central tube sections lie when folded.

4. The frame of claim 3 wherein said central tube section is the slidably mounted tube section, and said outboard tube is the fixedly mounted tube section.

5. The frame of claim 3 whereon outboard tube sections are mounted at both ends of said central tube sections.

6. The framework of claim 5 wherein outer ends of said outboard tube sections are open and mitered, and said vertical tubes have, adjacent opposite ends thereof, fingers adapted to be slid into said open outer ends of said outboard tube sections to form a rectangular framework.

7. The framework of claim 6 wherein both of said vertical tubes have, adjacent an upper end, a hanger.

8. The framework of claim 7 wherein the hanger comprises a hook, said hook having a stem, mounted for rotation in a boss carried by said vertical tube, and a hook arm at an end of said stem, adapted to swing from a position substantially against a flat surface of a finger of said vertical tube to a position at right angles to said frame.

9. The frame of claim 6 wherein said central, outboard section and vertical tubes all have a flat face with channels running lengthwise of said tubes, of the same configuration.

10. The frame of claim 9 wherein a frame magnetic strip is seated in a channel of each of said tubes and a header of flexible material is provided with a magnetic strip configured and dimensioned to engage said framework magnetic strip.

11. The frame of claim 10 wherein the frame channel is of a depth with respect to the magnetic strip seated in it to permit a header to lie within an ambit of a rib defining an outer margin of the frame.

12. The frame of claim 1 wherein the first parallel leaves are spaced to define a channel between them and are connected by a bridging part at a place remote from the knuckle, and a stop pin is fixedly mounted in and extends between top and bottom walls of the sliding tube section and extends within a channel between said first leaves.

\* \* \* \* \*